US012747803B2

(12) United States Patent
Hashish et al.

(10) Patent No.: US 12,747,803 B2
(45) Date of Patent: Sep. 29, 2026

(54) HIGH-PRESSURE FLUID ON/OFF VALVE AND COMPONENTS AND METHOD OF USE OF SAME

(71) Applicant: Flow International Corporation, Kent, WA (US)

(72) Inventors: Mohamed A. Hashish, Bellevue, WA (US); Sean R. Schramm, Buckley, WA (US)

(73) Assignee: Flow International Corporation, Kent, WA (US)

(*) Notice: Subject to any disclaimer, the term of this patent is extended or adjusted under 35 U.S.C. 154(b) by 79 days.

(21) Appl. No.: 18/526,923

(22) Filed: Dec. 1, 2023

(65) Prior Publication Data

US 2025/0180135 A1 Jun. 5, 2025

(51) Int. Cl.

| | |
|---|---|
| ***F16K 27/02*** | (2006.01) |
| ***B26F 3/00*** | (2006.01) |
| ***F16K 1/42*** | (2006.01) |
| ***F16K 31/122*** | (2006.01) |
| ***F16K 41/06*** | (2006.01) |

(52) U.S. Cl.

CPC ........ *F16K 27/0254* (2013.01); *F16K 31/122* (2013.01); *F16K 41/06* (2013.01); *B26F 3/004* (2013.01); *F16K 1/427* (2013.01); *F16K 2200/501* (2021.08); *Y10T 137/7668* (2015.04)

(58) Field of Classification Search

CPC .......... B26F 3/004; F16K 1/126; F16K 1/427; F16K 27/0254; F16K 31/122; F16K 31/1221; F16K 41/06; F16K 2200/501; Y10T 137/7504; Y10T 137/7559; Y10T 137/7613; Y10T 137/7668

USPC ........ 137/454.2, 454.4, 454.5, 454.6; 251/62

See application file for complete search history.

(56) References Cited

U.S. PATENT DOCUMENTS 40,723 A * 11/1863 Gilson ................ F04B 39/1033 137/454.4
1,733,421 A * 10/1929 Mauran ................... F16K 1/427 29/890.128
3,073,566 A * 1/1963 Bredtschneider ....... F16K 1/427 251/363
3,434,495 A * 3/1969 Scaramucci .......... F16K 15/063 137/454.2
4,114,851 A 9/1978 Shivak et al.

(Continued)

FOREIGN PATENT DOCUMENTS

WO WO-2022063513 A1 * 3/2022 ............ F16K 25/04

OTHER PUBLICATIONS

PCT Search Report and Written opinion from PCT Application No. PCT/US2024/057523 dated Mar. 12, 2025, 10 pages.

*Primary Examiner* — Kenneth Rinehart
*Assistant Examiner* — Jonathan J. Waddy
(74) *Attorney, Agent, or Firm* — Cozen O'Connor

(57) ABSTRACT

Disclosed herein are components, systems, and methods to improve performance and maintenance of high-pressure fluid systems, such as waterjet cutting systems. Specifically, embodiments of an on/off valve are disclosed that include a valve cartridge and a valve body. The valve cartridge housing a poppet, a seal, and seat, and the valve cartridge being removable from the valve body while the valve body remains coupled to components of the high-pressure fluid system including sources of pressurized air, high-pressure fluid, and a working tool, such as a waterjet cutting head.

15 Claims, 7 Drawing Sheets

(56) References Cited

U.S. PATENT DOCUMENTS

| | | | | |
|---|---|---|---|---|
| 4,444,214 | A | 4/1984 | Paul, Jr. | |
| 4,567,911 | A | 2/1986 | Kedem | |
| 4,587,990 | A | 5/1986 | Pennell et al. | |
| 6,802,541 | B2 | 10/2004 | Hopkins et al. | |
| 8,459,288 | B2 * | 6/2013 | Ishikawa | F02M 21/0245 137/15.19 |
| 2003/0034468 | A1 * | 2/2003 | Yie | F16K 31/3835 251/96 |
| 2018/0238468 | A1 | 8/2018 | Troxler | |
| 2019/0101221 | A1 * | 4/2019 | Hagen | F16K 1/422 |
| 2023/0366478 | A1 * | 11/2023 | Brunner | F16K 1/42 |

* cited by examiner

HIGH-PRESSURE FLUID ON/OFF VALVE AND COMPONENTS AND METHOD OF USE OF SAME

BACKGROUND

Technical Field

This disclosure relates to high-pressure fluid systems and related methods, and more particularly, to an on/off valve including a quick change cartridge for use in high-pressure fluid systems, such as waterjet cutting systems, and methods of use and operation related to the high-pressure on/off valve.

Description of the Related Art

High-pressure fluid systems have numerous applications including, but not limited to, use in waterjet cutting systems. High-pressure fluid systems include valves, which regulate the flow of a fluid by opening, closing, or partially obstructing a flow path of the fluid.

Known high-pressure fluid systems are typically coupled to a source of high-pressure fluid, which the systems uses as an input to produce a desired output. For example, known waterjet cutting systems receive high-pressure water and use the high-pressure water to form a waterjet, which is capable of altering a workpiece (e.g., cutting through the workpiece to form a desired shape from the workpiece). The high-pressure water in known waterjet cutting systems is typically generated by a pump that is located upstream of a cutting head in which the waterjet is formed. These known systems include an on/off valve positioned between the pump and the cutting head to selectively permit passage of the high-pressure water to the cutting head (i.e., allow passage while the cutting head is in use and prevent passage when the cutting head is not in use).

Referring to FIGS. 1 and 2, a known high-pressure on/off valve 20 (referred to herein as “the known valve 20”) receives high-pressure water 22 generated by a pump 24, which is upstream from the known valve 20 with respect to a flow path (indicated by arrow 26) of the high-pressure water 22. The known valve 20 is positioned between the pump 24 and a cutting head 17 of a waterjet cutting system with respect to the flow path 26. As shown, the high-pressure water 22 is generated by the pump 24, enters the known valve 20 (e.g., via a conduit and/or coupling 28, passes through the known valve 20, and after exiting the known valve 20, enters the cutting head 17.

The known valve 20 includes a poppet 30 and a seat 32. As shown, the poppet 30 is in the form of a cylindrical rod with a tapered end. The seat 32 is typically a cylindrical body 34 with a hole 36 extending therethrough. The known valve 20 includes a closed configuration (shown in FIG. 1) in which the tapered end of the poppet 30 abuts the seat 32 so as to plug the hole 36 as shown. In the closed configuration passage of the high-pressure water 22 through the hole 36 is prevented, and thus passage of the high-pressure water 22 to the cutting head 17 via the known valve 20 is prevented.

The known valve 20 transitions to an open configuration when the poppet 30 is removed from contact with the seat 32, as shown in FIG. 2. The known valve 20 includes an actuator 40 that is operably coupled to the poppet 30. The actuator 40 is typically pneumatic and coupled to a source of pressurized air (e.g., a pump 42). The pump 42 delivers pressurized air 44 (e.g., via a conduit and/or coupling 46) along a flow path (indicated by arrow 45) to an internal chamber 48 within the actuator 40.

As the pressurized air 44 enters the internal chamber 48, the pressurized air 44 forces a piston 50 of the actuator 40 to move in a direction away from the seat 32. As the piston 50 moves away from the seat 32, the poppet 30 also moves away from the seat 32, thereby unplugging the hole 36 and allowing passage of the high-pressure water 22 to the cutting head 17 via the known valve 20.

To transition back to the closed configuration, the pressurized air 44 is removed/vented/released from the internal chamber 48, so that a biasing member (e.g., a spring 52) exerts a force against the piston 50 to move the piston 50 back towards the seat 32, thereby moving the coupled poppet 30 back into contact with the seat 32 once again plugging the hole 36.

During use the known valve 20 may cycle through tens or hundreds of thousands of transitions between the open and closed configurations. Failure of the components of the known valve 20 is common and may result in leaks and or loss of pressure, which may require a system shutdown or degradation in performance. Known failure modes for the known valve 20 include damage to the poppet 30 (specifically, the tapered end that contacts the seat 32), damage to the seat 32 (specifically, the portion adjacent the hole 36 that contacts the poppet 30), and wear/damage of a radial seal 54 of the known valve 20 through which the poppet 30 reciprocates when transitioning between the open and closed configurations.

Failure of any of the three components listed above requires a rebuild of the known valve 20. The rebuild is time consuming as the cutting head 17 (including a coupling 56 that secures the cutting head 17 relative to the known valve 20) and the known valve 20 must be removed from the remainder of the system (i.e., the coupling 28 for the high-pressure water 22 and the coupling 46 for the pressurized air 44). Then, the known valve 20 is disassembled by removing the actuator 40 (e.g., by disengaging an actuator coupling 58) and the coupling 56 for the cutting head 17. The operator may then access and repair/replace any of the intricate components of the known valve 20 (i.e., the poppet 30, the seat 32, the radial seal 54, etc.). In addition to being time intensive, accessing the interior components of the known valve 20 may result in damage to the known valve 20, which may result in additional failures and/or system downtime in the future.

BRIEF SUMMARY

Embodiments described herein provide a high-pressure on/off valve cartridge, pre-assembled from the factory and configured to be inserted (e.g., “dropped into”) a cavity in a valve body. The high-pressure on/off valve cartridge addresses the problems described above related to known valve 20. Specifically, embodiments of the high-pressure on/off valve cartridge described herein include a single unit (or part) that an operator may remove from/replace within a valve body, while the valve body remains attached to adjacent components of the system (e.g., high-pressure water lines/conduits, pressurized air lines/conduits, a waterjet cutting head, etc.). One advantage to the components remaining attached is the avoidance of a realignment (e.g., of the cutting head 17), which may be needed for the known valve 20 due to removal of said components.

Embodiments of the high-pressure on/off valve cartridge described herein may be removed and replaced within about one minute, which is a substantial improvement to the one hour usually needed to remove and replace the known valve 20. Removal/replacement of embodiments of the high-pressure on/off valve cartridge may involve translational movement (e.g., translating the high-pressure on/off valve cartridge along one direction relative to the valve body). The entire processes of removal/replacement of the high-pressure on/off valve cartridge may use no torque (i.e., the high-pressure on/off valve cartridge, nor any of its components, are rotated relative to the valve body), lowering effort needed to replace the high-pressure on/off valve cartridge.

The simple installation process increases the probability of a proper installation, as there are less components to keep track of, and there is no need to access the interior of the high-pressure on/off valve cartridge and expose the intricate interior components. Additionally, embodiments of the high-pressure on/off valve cartridge are removable from the actuator, enabling the actuator to remain in service for longer, as it may have a longer operational lifetime than the high-pressure on/off valve cartridge.

According to one embodiment, an on/off valve cartridge includes a housing having a first surface, a second surface that faces away from the first surface, and a side surface that extends between the first surface and the second surface. The on/off valve cartridge further includes an internal cavity formed within and enclosed by the housing. The internal cavity includes a through hole that extends from a first opening formed in the first surface to a second opening formed in the second surface, and the internal cavity further includes a non-through hole that extends from a third opening formed in the side surface and intersects the through hole at an intersection.

The on/off valve cartridge includes a seat positioned within the through hole and below the intersection, and the seat includes a seat body and a seat hole extending through the seat body. The on/off valve cartridge includes a radial seal positioned within the through hole and above the intersection, and the radial seal includes a seal body and a seal hole extending through the seal body.

The on/off valve cartridge includes a poppet positioned within the through hole such that a first portion of the poppet contacts the seat and blocks the seat hole, and a second portion of the poppet is positioned within the seal hole of the radial seal. The poppet is movable away from the seat, and an entirety of the poppet is positionable within the through hole between the first surface and the second surface. A face seal of the on/off valve cartridge is positioned within the non-through hole between the third opening and the intersection.

According to one embodiment, a valve body includes a body housing having a first body surface, a second body surface that faces away from the first body surface, a side body surface that extends between the first body surface and the second body surface, and a front body surface that extends between the first body surface and the second body surface and that is angularly offset with respect to the side body surface. The valve body further includes a body internal cavity formed within and enclosed by the body housing, the body internal cavity including a hub, a body through hole, a body non-through hole, and a passage.

The hub is sized to receive the on/off valve cartridge such that the on/off valve cartridge is entirely enclosed within the body housing. The body through hole extends from a first body opening formed in the first body surface, through the hub, to a second body opening formed in the second body surface. The body non-through hole extends from a third body opening formed in the side body surface and intersects and terminates within the hub. The passage extends from a fourth body opening formed in the front body surface, and the passage intersects and terminates within the hub. The fourth body opening is sized to permit passage of the on/off valve cartridge into and out of the body internal cavity.

Additional embodiments described herein provide an on/off valve including both the valve cartridge described above and the valve body described above.

Additional embodiments described herein provide a method of replacing a poppet, a seal, and a seat in an on/off valve. The on/off valve includes a valve body coupled to a source of pressurized air by a first coupling and coupled to a source of high-pressure fluid by a second coupling. The on/off valve includes a valve cartridge positioned within an internal cavity of the valve body, and the poppet, the seal, and the seat are positioned within an internal cavity of the valve cartridge.

The method includes moving the poppet along a first direction into contact with the seat thereby plugging a seat hole of the seat that extends through a seat body of the seat, wherein plugging the seat hole transitions the on/off valve into a closed configuration, and moving the valve cartridge through a passage of the internal cavity of the valve body along a second direction that is perpendicular to the first direction, thereby simultaneously moving both the poppet and the seat relative to the valve body.

The method further includes moving the valve cartridge through an opening of the valve body, thereby removing the valve cartridge, which contains the poppet, the seal, and the seat, from the internal cavity of the valve body, and further includes moving a replacement valve cartridge through the opening, thereby entering the internal cavity of the valve body with the replacement valve cartridge, which contains a replacement poppet, a replacement seal, and a replacement seat each positioned within an internal cavity of the replacement valve cartridge. The first coupling and the second coupling remain coupled to the valve body while moving the poppet along a first direction, moving the valve cartridge through the passage, moving the valve cartridge through the opening, and moving the replacement valve cartridge through the opening.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. For example, space is shown between adjacent components in the drawings to improve clarity and understanding of the drawings, when in practice the adjacent components may be in direct contact (e.g., such that a water-tight barrier is formed between the adjacent components). Further, the particular shapes of the elements as drawn, are not necessarily intended to convey any information regarding the actual shape of the particular elements and may have been solely selected for ease of recognition in the drawings.

DETAILED DESCRIPTION

Figure 1:
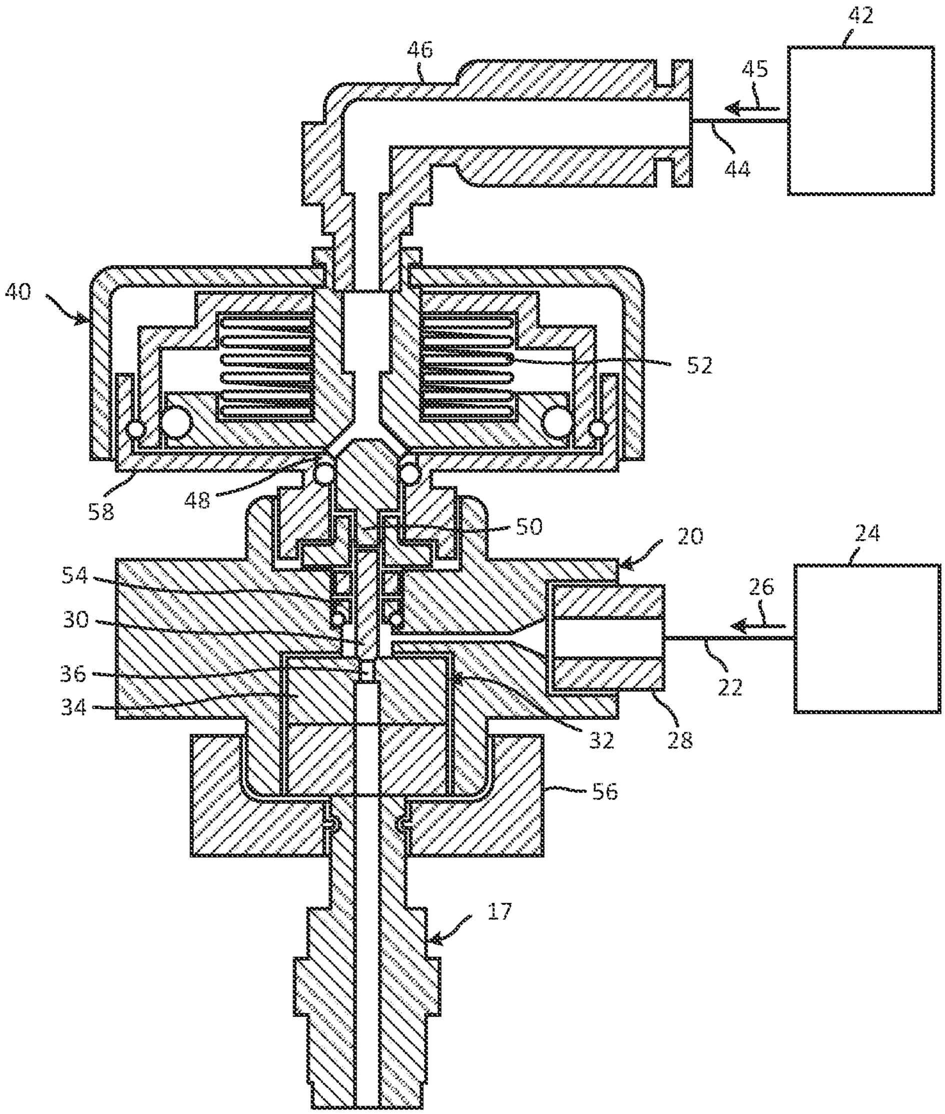
Fig. 1 Prior Art
FIG. 1 is a front, cross-section view of a known valve in a closed configuration.
Figure 2:
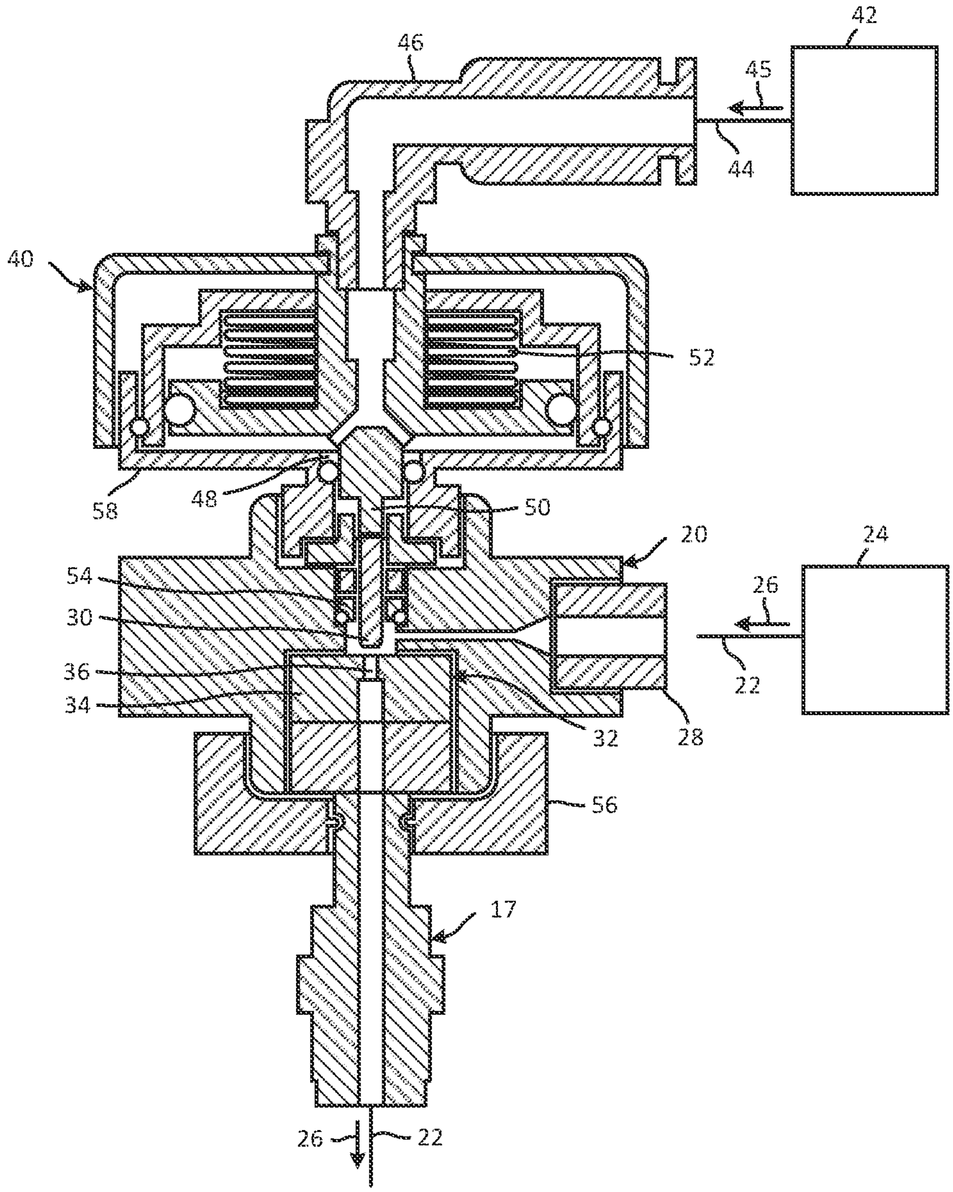
Fig. 2 Prior Art
FIG. 2 is a front, cross-section view of the known valve illustrated in FIG. 1 in a closed configuration.

In the following description, certain specific details are set forth to provide a thorough understanding of various disclosed embodiments. However, one of ordinary skill in the relevant art will recognize that embodiments may be practiced without one or more of these specific details, or with other methods, components, materials, etc. In other instances, well-known structures associated with on/off valves for high-pressure fluid systems have not been shown or described in detail to avoid unnecessarily obscuring descriptions of the embodiments.

Unless the context requires otherwise, throughout the specification and claims which follow, the word “comprise” and variations thereof, such as, “comprises” and “comprising” are to be construed in an open, inclusive sense, that is as “including, but not limited to.”

Reference throughout this specification to “one embodiment” or “an embodiment” means that a particular feature, structure or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

As used in this specification and the appended claims, the singular forms “a,” “an,” and “the” include plural referents unless the content clearly dictates otherwise. It should also be noted that the term “or” is generally employed in its broadest sense, that is as meaning “and/or” unless the content clearly dictates otherwise. Reference herein to two elements “facing” or “facing toward” each other indicates that a straight line can be drawn from one of the elements to the other of the elements without contacting an intervening solid structure.

The headings and Abstract of the Disclosure provided herein are for convenience only and do not interpret the scope or meaning of the embodiments.

Referring to FIGS. 3 to 6, a high-pressure on/off valve 120 (referred to herein as “the valve 120”) may be in operation as part of a high-pressure fluid system 100. “High-pressure fluid” as used herein includes fluid(s) at a pressure sufficient to operate a waterjet cutting head 117 (e.g., such that the waterjet cutting head 117 generates a waterjet with sufficient power to pierce through a workpiece). According to one embodiment, “high-pressure fluid” includes fluid(s) (e.g., liquids such as water) pressurized to at least 15,000 psi. According to one embodiment, “high-pressure fluid” includes fluid(s) (e.g., liquids such as water) pressurized to between 15,000 psi and 120,000 psi. According to one embodiment, “high-pressure fluid” includes fluid(s) (e.g., liquids such as water) pressurized to ultra-high pressures between 90,000 psi and 120,000 psi.

The valve 120 may receive high-pressure fluid 122 (e.g., water between 15,000 psi and 120,000 psi) generated by a pump 124. The pump 124 may be positioned upstream from the valve 120 with respect to a flow path (indicated by arrow 126) of the high-pressure fluid 122. The valve 120 may be positioned between the pump 124 and another component of the high-pressure fluid system 100 (e.g., the cutting head 117 of a waterjet cutting system) with respect to the flow path 126.

As shown, the high-pressure fluid 122 may enter the valve 120 (e.g., via a conduit and/or coupling 128), pass through the valve 120, and after exiting the valve 120, enter the cutting head 117. According to one embodiment, the high-pressure fluid 122 may enter the valve 120 along a first direction D1, and the high-pressure fluid 122 may exit the valve 120 along a second direction D2 that is perpendicular to the first direction D1.

Figure 3:
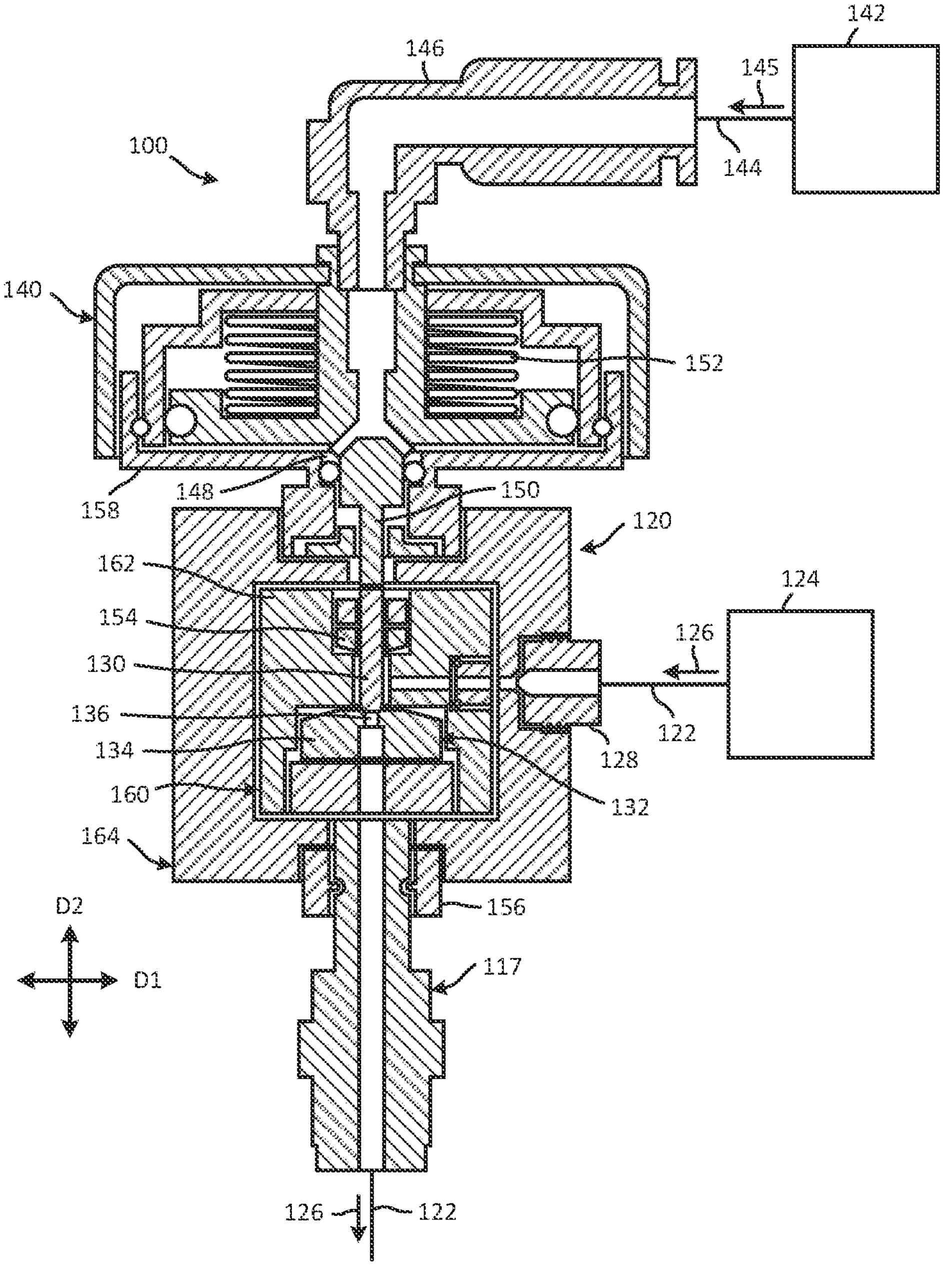
FIG. 3 is a front, cross-section view of an on/off valve according to one embodiment.

The valve 120 may include a valve cartridge 160 having a cartridge housing 162, the cartridge housing 162 at least partially enclosing a poppet 130 and a seat 132. As shown, the poppet 130 may be in the form of an elongated body. The seat 132 includes a seat body 134 with a seat hole 136 extending therethrough. The valve 120 may include a closed configuration (e.g., as shown in FIG. 3) in which the poppet 130 (e.g., a first portion 131 such as a tapered end of the poppet 130) abuts the seat 132 so as to plug the hole 136. In the closed configuration passage of the high-pressure water 122 through the hole 136 is prevented, and thus passage of the high-pressure water 122 to the cutting head 117 via the valve 120 is prevented.

Figure 6:
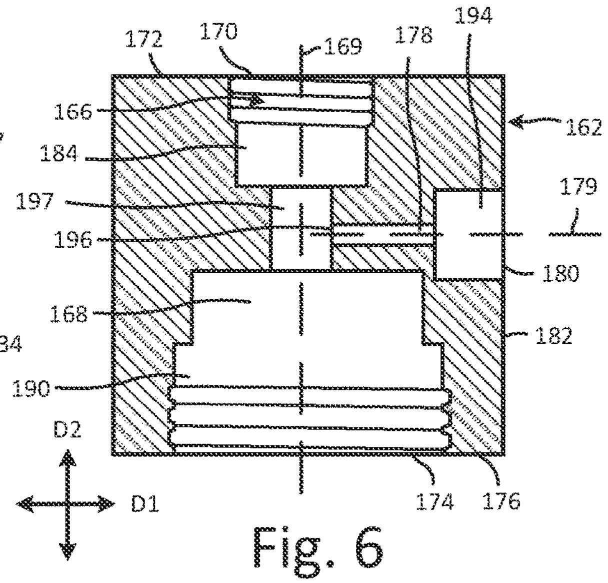
FIG. 6 is a front, cross-section view of the valve cartridge illustrated in FIG. 5, the valve cartridge in an open configuration.

The valve 120 may transition to an open configuration when the poppet 130 is removed from contact with the seat 132 (e.g., as shown in FIG. 6). The valve 120 may include an actuator 140 that is secured relative to a valve body 164 and operably coupled to the poppet 130. The actuator 140 may be pneumatic and coupled to a source of pressurized air (e.g., a pump 142). When the high-pressure system 100 is in operation, the pump 142 may deliver pressurized air 144 (e.g., via a conduit and/or coupling 146) along a flow path (indicated by arrow 145) to an internal chamber 148 within the actuator 140.

As the pressurized air 144 enters the internal chamber 148, the pressurized air 144 may exert a force against a piston 150 of the actuator 140 to move the piston 150 in a direction away from the seat 132 (e.g. along the second direction D2, opposite the vector that the high-pressure fluid 122 follows when exiting the valve 120). Movement of the piston 150 away from the seat 132 allows movement of the poppet 130 away from the seat 132 (e.g., in response to contact with/pressure exerted by the high-pressure fluid 122), thereby unplugging the hole 136 and allowing passage of the high-pressure fluid 122 to the cutting head 117 via the valve 120.

To transition back to the closed configuration, the pressurized air 144 may be removed/vented/released from the internal chamber 148, so that a biasing member (e.g., a spring 152) exerts a force against the piston 150 to move the piston 150 back towards the seat 132, thereby moving the poppet 130 back into contact with the seat 132 once again plugging the hole 136. As shown, the actuator 140 may be secured relative to the valve body 164 by a coupling 158 that remains stationary (e.g., relative to the valve body 164) during transition of the valve 120 between the open and closed configurations.

Although shown together in an assembled configuration, each of the valve cartridge 160, the valve body 164, and the actuator 140 may be separate components manufactured, assembled, and sold individually or as an assembly. For example, one or more valve cartridges 160 may be manufactured as a standalone product to be used as replacement parts when a valve cartridge 160 currently in use within the high-pressure system 100 is due for replacement (e.g., based on its expected operational lifetime or in response to a detected failure).

During use the valve 120 may cycle through tens or hundreds of thousands of transitions between the open and closed configurations. Failure of the components of the valve 120 may result in leaks and or loss of pressure, which may require a system shutdown or degradation in performance. Known failure modes for the valve 20 may include damage to the poppet 130 (specifically, portion(s) of the poppet 130 that contact the seat 132), damage to the seat 132 (specifically, a portion adjacent the hole 136 that contacts the poppet 130), and wear/damage of a radial seal 154 of the valve 120 through which the poppet 130 reciprocates when transitioning between the open and closed configurations.

Figure 4:
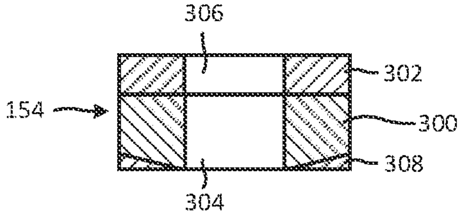
FIG. 4 is a front, cross-section view of a seal body of the on/off valve illustrated in FIG. 3, according to one embodiment.

The radial seal 154 may include a seal body 155 and a seal hole 157 that extends through the seal body 155. According to one embodiment, the radial seal 154 may include an assembly of multiple components. As shown in FIG. 4, the radial seal 154 (e.g., the seal body 155) may include a seal support 300 and a backup ring 302. The seal support 300 and the backup ring 302 may include different materials (e.g., a polymer for the seal support 300 and a copper-based material for the backup ring 302). The components of the radial seal 154 are not limited to these materials, as others may be used.

The seal support 300 may include a through hole 304 and the backup ring 302 may include a through hole 306, and the through holes 304 and 306 may cooperatively form the seal hole 157. The radial seal 154 may further include a resilient member 308 (e.g., a seal, such as an o-ring made of a compressible material) positioned between the seal support 300 and the cartridge housing 162. The resilient member 304 may have a circular cross-section or some other shape (e.g., tapered, ramped, etc.) when unbiased (i.e., not compressed). When the high-pressure fluid system 100 is in operation the seal support 300 may exert a force on the resilient member 304, thereby compressing the resilient member 304 and forming a liquid-tight seal.

A second portion 133 of the poppet 130 (e.g., a cylindrical body of the poppet 130) may translate through the seal body 155 as the valve 120 transitions between the open configuration and the closed configuration. Normal operation of the high-pressure system 100, or a failure of any of the components listed above may require maintenance to be performed on the valve 120. The rebuild is less time consuming than that of the known valve 20, as the cutting head 117 (including a coupling 156 that secures the cutting head 117 relative to the valve 120), the coupling 128 for the high-pressure liquid 122, and the coupling 146 for the pressurized air 144 may all remain attached to the valve body 164. The valve 120 may be disassembled by removing the valve cartridge 160 (e.g., by translating the valve cartridge along a third direction D3 that is perpendicular to both the first direction D1 and the second direction D2). The operator may then insert a replacement valve cartridge 160 (e.g., by translating the replacement valve cartridge 160 along the third direction D3 in the vector opposite that followed during removal of the valve cartridge 160).

Figure 5:
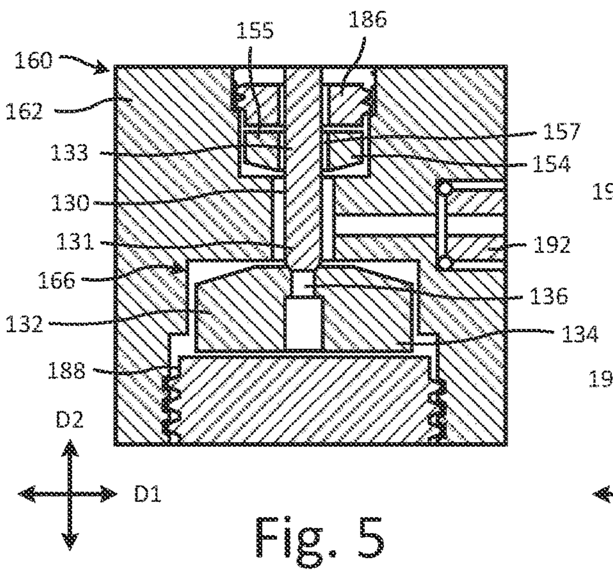
FIG. 5 is a front, cross-section view of a valve cartridge of the on/off valve illustrated in FIG. 3, according to one embodiment, the valve cartridge in a closed configuration.

Referring to FIGS. 5 and 6, the valve cartridge 160 may include a cartridge internal cavity 166 formed within and enclosed by the cartridge housing 162. The poppet 130, the seat 132, and the radial seal 154 may all be positioned within the cartridge internal cavity 166, such that movement of the cartridge housing 162 results in simultaneous movement of the poppet 130, the seat 132, and the radial seal 154. The cartridge internal cavity 166 may include a through hole 168 that extends (e.g., along a central axis 169) through the cartridge housing 162 along a direction. As shown, the through hole 168 may extend along the second direction D2 from a first opening 170 formed in a first surface (e.g., an upper surface 172) of the cartridge housing 162 to a second opening 174 formed in a second surface (e.g., a lower surface 176) of the cartridge housing 162. The upper surface 172 and the lower surface 176 may face opposite one another (e.g., with respect to the second direction D2).

The cartridge internal cavity 166 may further include a non-through hole 178 that extends (e.g., along a central axis 179) through the cartridge housing 162 along a direction. As shown, the non-through hole 178 may extend along the first direction D1 from a third opening 180 formed in a side surface 182 of the cartridge housing 162 and intersect with the through hole 168. The side surface 182 may extend between the upper surface 172 and the lower surface 176 (e.g., from the upper surface 172 to the lower surface 176). The non-through hole 178 may effectively terminate within the through hole 168 (i.e., such that the non-through hole 178 does not extend out of the cartridge housing 162 through another opening in an exterior surface opposite the side surface 182). According to one embodiment the non-through hole 178 may be a blind hole, a pocket hole, or a closed hole.

The valve cartridge 160 may include a seal retainer 186 (also referred to as a "backup ring") that positions and supports the radial seal 154. As shown, the seal retainer 186 and the radial seal 154 may be positioned within (e.g., threadedly engaged with) an upper portion 184 of the through hole 168 (e.g., such that the radial seal 154 is between the seat 132 and the seal retainer 186 with respect to the second direction D2). The upper portion 184 may include the first opening 170. According to one embodiment, the seal retainer 186 abuts the radial seal 154 and prevents movement (e.g., translation away from the seat 132) of the radial seal 154 that may otherwise result from movement of the poppet 130 through the radial seal 154 as the valve cartridge 160 transitions from the closed configuration to the open configuration.

The valve cartridge 160 may include a seat retainer 188 that positions and supports the seat 132. As shown, the seat retainer 188 and the seat 132 may be positioned within (e.g., threadedly engaged with) a lower portion 190 of the through hole 168 (e.g., such that the seat 132 is between the poppet 130 and the seat retainer 188 with respect to the second direction D2). The lower portion 190 may include the second opening 174. According to one embodiment, the seat retainer 188 abuts the seat 132 and prevents movement (e.g., translation away from the poppet 130) of the seat 132 that may otherwise result from impact of the poppet 130 with the seat 132 as the valve cartridge 160 transitions from the open configuration to the closed configuration. The seat retainer 188 may be fastened (e.g., threadedly connected) to the cartridge housing 162, according to one embodiment.

The valve cartridge 160 may include a face seal 192 positioned within an outer portion 194 of the non-through hole 178. As shown, the outer portion 194 may include the third opening 180. The face seal 192 may be positioned between the third opening 180 and an intersection 196 of the through hole 168 and the non-through hole 178.

The valve cartridge 160 (e.g., the outer portion 194 of the non-through hole 178) may include a gasketless seal between like metal components (i.e., a metal-to-metal seal). Examples of the gasketless seal are provided in U.S. Pat. No. 6,802,541, the disclosure of which is incorporated herein in its entirety. The gasketless seal may be positioned between the third opening 180 and an intersection 196 of the through hole 168 and the non-through hole 178.

The cartridge internal cavity 166 may include a cartridge hub 197 positioned, as shown, such that both the through hole 168 and the non-through hole 178 pass through the cartridge hub 197. According to one embodiment, the through hole 168 and the non-through hole 178 (or at least the central axis 169 and the central axis 179) intersect within the cartridge hub 197.

The valve cartridge 160 may include one or more resilient members (e.g., o-rings, seals, gaskets, etc.) positioned between adjacent components to cooperatively form a liquid-impermeable barrier (i.e., a "seal") that prevents or at least limits passage of the high-pressure fluid between the adjacent components.

Figure 7:
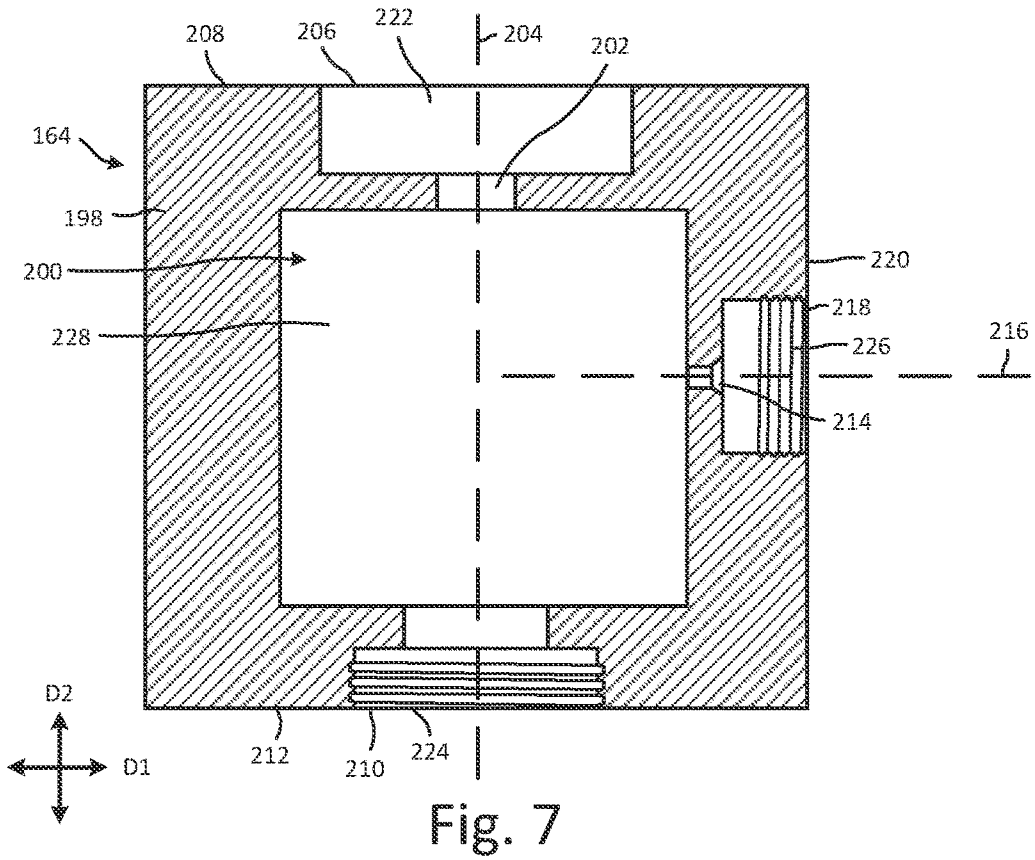
FIG. 7 is a front, cross-section view of a valve body of the on/off valve illustrated in FIG. 3, according to one embodiment.
Figure 8:
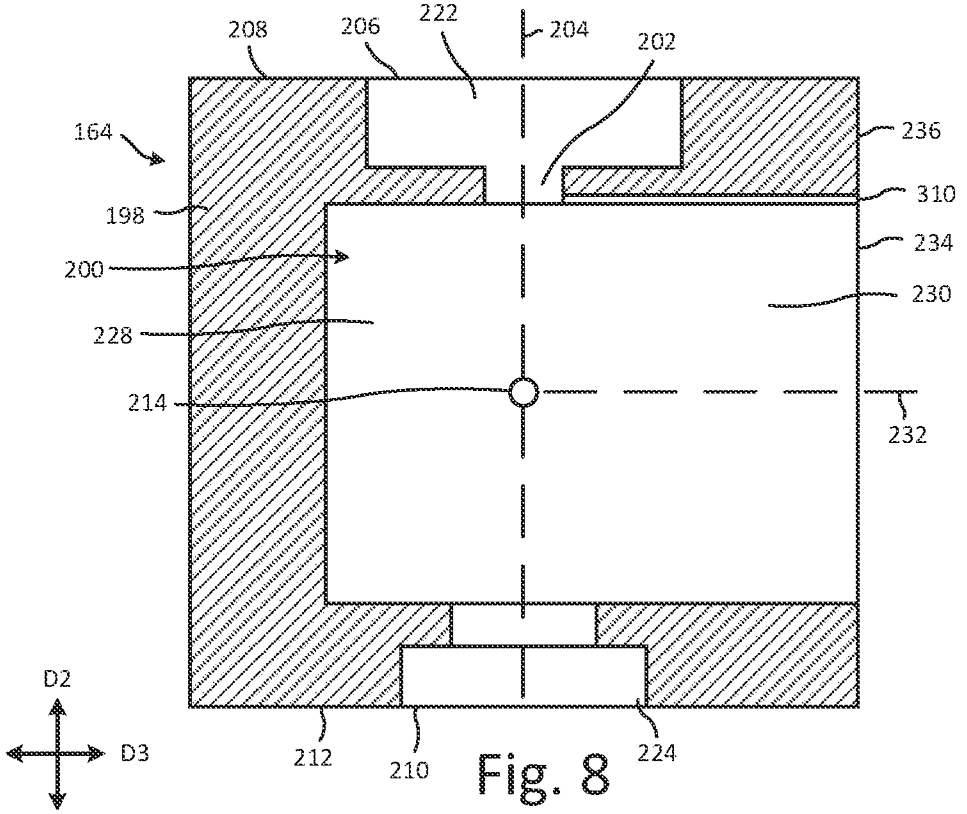
FIG. 8 is a side, cross-section view of the valve body illustrated in FIG. 7, according to one embodiment.
Figure 9:
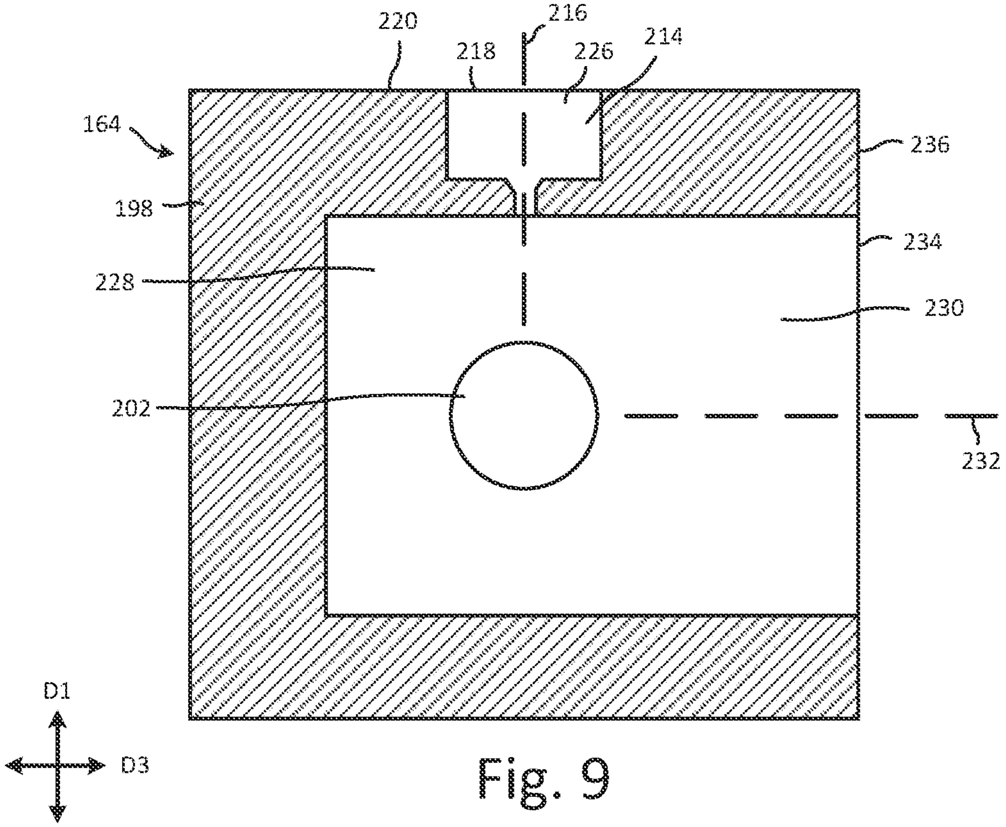
FIG. 9 is a top, cross-section view of the valve body illustrated in FIG. 7, according to one embodiment.
Figure 10:
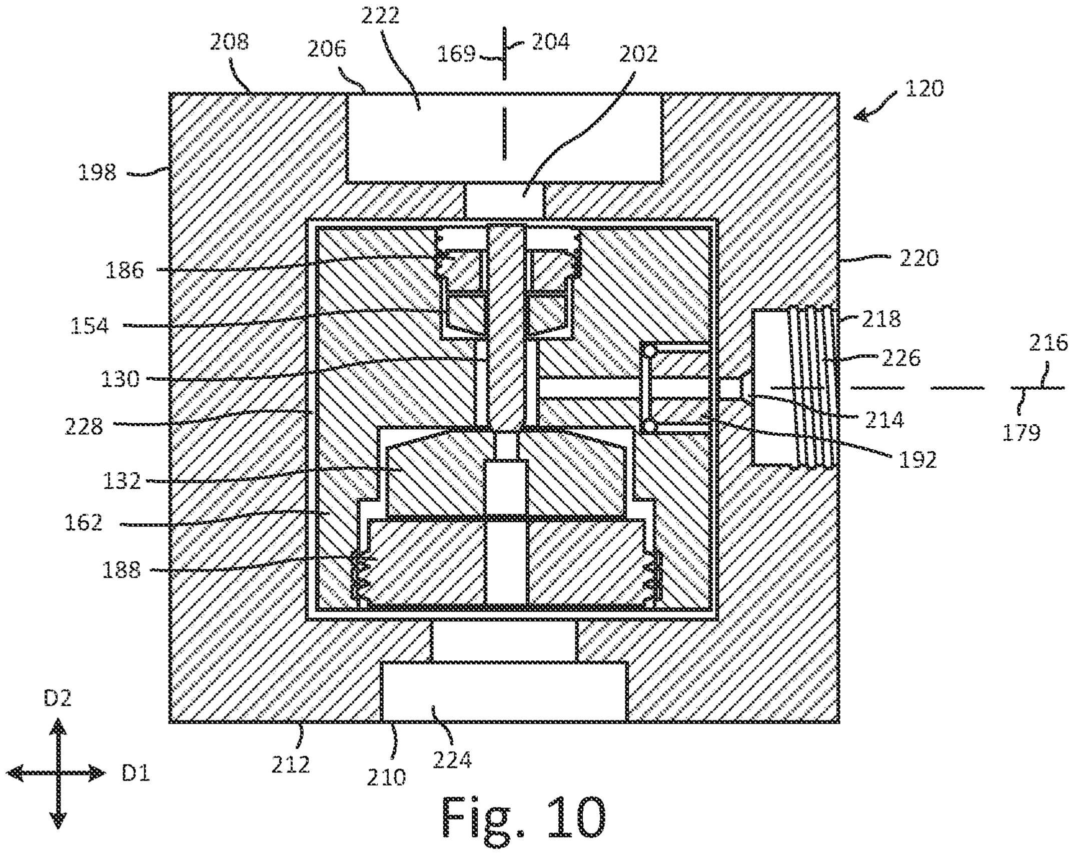
FIG. 10 is a front, cross-section view of the on/off valve illustrated in FIG. 3, according to one embodiment.
Figure 11:
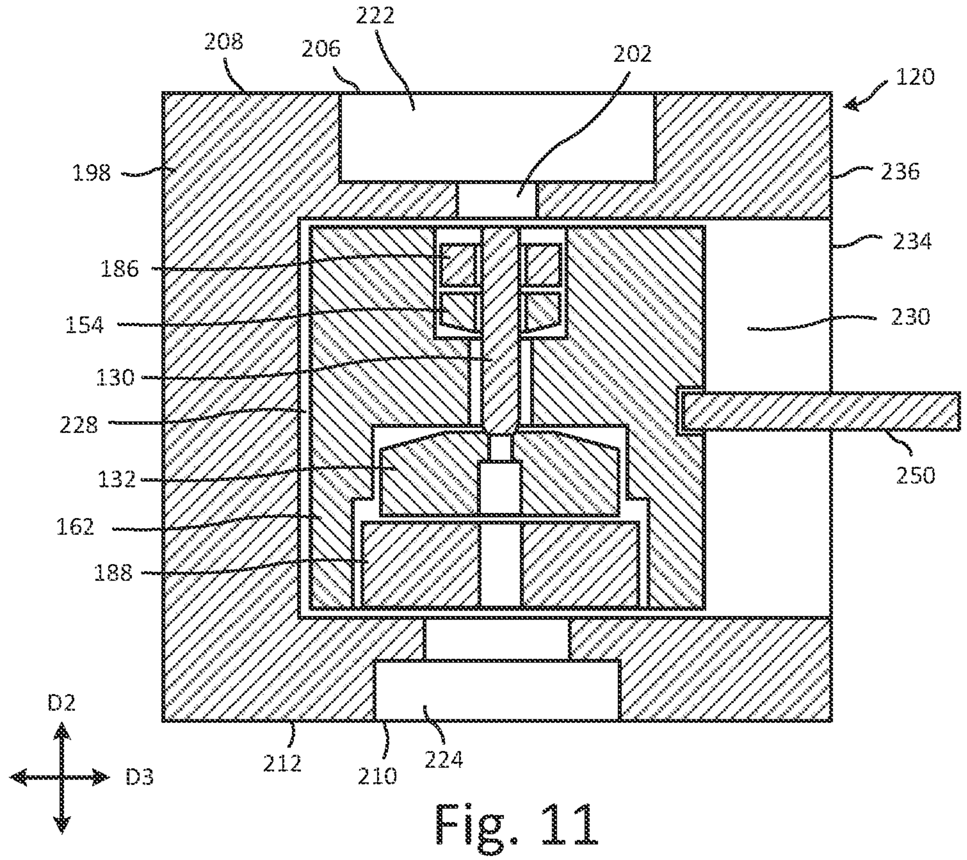
FIG. 11 is a side, cross-section view of the on/off valve illustrated in FIG. 3, according to one embodiment.

Referring to FIGS. 7 and 8, the valve body 164 has a body housing 198 and a body internal cavity 200 formed within and enclosed by the body housing 198. The valve cartridge 160 may be positioned within the internal cavity 200. The body internal cavity 200 may include a through hole 202 that extends (e.g., along a central axis 204) through the body housing 198 along a direction. As shown, the through hole 202 may extend along the second direction D2 from a first opening 206 formed in an upper surface 208 of the body housing 198 to a second opening 210 formed in a lower surface 212 of the body housing 198. The upper surface 208 and the lower surface 212 may face opposite one another (e.g., with respect to the second direction D2).

The body internal cavity 200 may further include a non-through hole 214 that extends (e.g., along a central axis 216) through the body housing 198 along a direction. As shown, the non-through hole 214 may extend along the first direction D1 from a third opening 218 formed in a side surface 220 of the body housing 198 and intersect with the through hole 202. The non-through hole 214 may effectively terminate within the through hole 202 (i.e., such that the non-through hole 214 does not extend out of the body housing 198 through another opening in an exterior surface opposite the side surface 220).

Referring to FIGS. 3 to 7, the through hole 202 may include an upper portion 222 that receives a coupling (e.g., the coupling 158) that secures the actuator 140 relative to the valve body 164. The upper portion 222 may include threads (e.g., internal threads) that correspond to (i.e., threadedly engage with) threads of the coupling 158. The upper portion 222 and the coupling 158 may also be secured via other connection types instead of or in addition to threads (e.g., barbed, push-fit, magnetic, etc.). The through hole 202 may include a lower portion 224 that receives a coupling (e.g., the coupling 156) that secures a tool (e.g., the cutting head 117) relative to the valve body 164. The lower portion 224 may include threads (e.g., internal threads) that correspond to (i.e., threadedly engage with) threads of the coupling 156.

The non-through hole 214 may include an outer portion 226 that receives a coupling (e.g., the coupling 128) that fluidly couples the valve body 164 to a source of high-pressure fluid (e.g., the pump 124). The outer portion 226 may include threads (e.g., internal threads) that correspond to (i.e., threadedly engage with) threads of the coupling 128.

The body internal cavity 200 may include a body hub 228 that receives the valve cartridge 160. The body hub 228 may be positioned, as shown, such that both the through hole 202 and the non-through hole 214 pass through the body hub 228. According to one embodiment, the through hole 202 and the non-through hole 214 (or at least the central axis 204 and the central axis 216) intersect within the body hub 228.

Referring to FIGS. 8 to 12, the body internal cavity 200 may include a passage 230 that extends (e.g., along a central axis 232) through the body housing 198 along a direction. As shown, the passage 230 may extend along the third direction D3 from a fourth opening 234 formed in a front surface 236 of the body housing 198 and intersect with the body hub 228. The passage 230 may effectively terminate within the body hub 228 (i.e., such that the passage 230 does not extend out of the body housing 198 through another opening in an exterior surface opposite the front surface 236).

The passage 230 may be sized and/or shaped to correspond to a size and/or shape of the valve cartridge 160, such that the valve cartridge 160 may enter the passage 230 through the fourth opening 234 and be positioned within the body hub 228. For example, the housing 162 and the passage 230 may both be cuboid (e.g., cubic) in shape.

According to one embodiment, the body hub 228 and the passage 230 may be shaped so as to correspond to the valve cartridge 160 such that the valve cartridge 160 is only positionable within the body hub 228 in one orientation relative to the valve body 164. For example, the housing 162 and the passage 230 may both be polygonal or irregular in shape. The housing 162 and the passage 230 may both be cuboid in shape with a chamfered corner to ensure proper alignment of the valve cartridge 160 and the valve body 164 when the housing 162 is positioned within the body hub 228. The valve cartridge 160 may, according to one embodiment, be positionable within the body hub 228 such that the through hole 168 is aligned with the through hole 202 and the non-through hole 178 is aligned with the non-through hole 214 (e.g., such that the central axis 169 is collinear with the central axis 204 and such that the central axis 179 is collinear with the central axis 216).

The valve 120 may include one or more registration features 240 that align the valve cartridge 160 and the valve body 164. The housing 162, the body housing 198, or both may include one or more of the registration features 240. For example, an interior surface 242 of the body housing 198 may include a projection 244 that abuts an exterior surface 246 of the housing 162 when the valve cartridge 160 is inserted and properly aligned within the body hub 228. Similarly, the exterior surface 246 of the housing 162 may include the projection 244 that abuts the interior surface 242 when the valve cartridge 160 is inserted and properly aligned within the body hub 228. One or more exterior surfaces of the housing 162 (e.g., the exterior surface 246), one or more interior surfaces of the body housing 198 (e.g., the interior surface 242), or both may include a groove 248 that corresponds in shape to a respective one of the projections 244 on the other of the housing 162 or the body housing 198.

Figure 12:
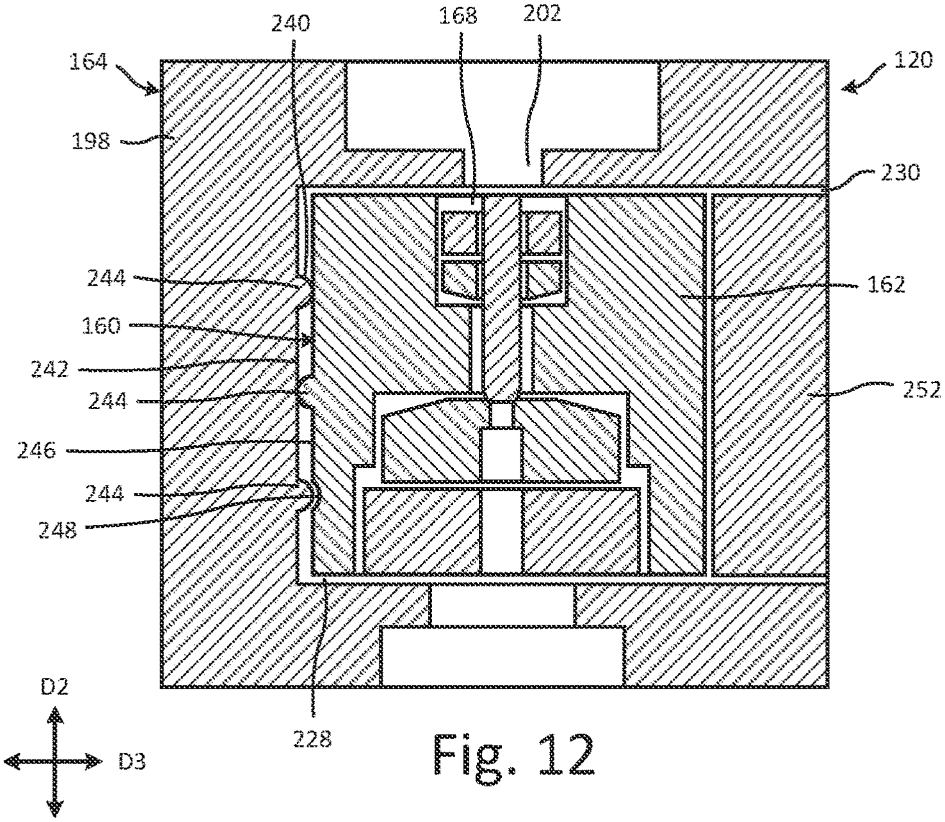
FIG. 12 is a side, cross-section view of the on/off valve illustrated in FIG. 3, according to one embodiment.

The valve 120 may include a handle 250 (e.g., integral with or releasably attachable to) that an operator may grab/hold to manipulate and maneuver the valve cartridge 160 into and out of the hub 228. According to one embodiment, the valve cartridge 160 may be retained within the valve body 164 (e.g., the hub 228) without any additional retention mechanism (e.g., via a friction fit). As shown in FIG. 12, the valve 120 may include a retention mechanism 252 (e.g., a door, flange, plate, biased member, etc.) that blocks at least a portion of the passage 230 when the valve cartridge 160 is positioned within the hub 228 to prevent removal of the valve cartridge 160 from the valve body 164.

Referring to FIGS. 3 to 12, a method of performing maintenance on a high-pressure on/off valve may include replacing a used poppet and seat with a replacement poppet and seat. According to one embodiment, the method may include (if the valve 120 is in the open configuration) transitioning the valve 120 to the closed configuration. Transitioning the valve 120 to the closed configuration may include plugging the hole 136 of the seat 132 with the tapered end of the poppet 130. Plugging the hole 136 may include removing (e.g., venting, releasing, vacuuming, etc.) the pressurized air 144 from the internal chamber 148, so that the spring 152 exerts a force against the piston 150 and moves the piston 150 back towards the seat 132, thereby moving the poppet 130 back into contact with the seat 132, plugging the hole 136, and preventing passage of the high-pressure fluid 122 through the hole 136.

The method may include disconnecting the actuator 140 (e.g., the piston 150) from the poppet 130 and then withdrawing the any portion of the actuator 140 that is positioned in the cartridge internal cavity 166 (e.g., a portion of the piston 150) from the cartridge internal cavity 166. After disconnecting the actuator 140 from the poppet 130 and withdrawing the piston 150 from the cartridge internal cavity 166, the valve 120 may be devoid of any component that is positioned on both sides of the first opening 170.

As shown, the actuator 140, the piston 150, and the poppet 130 may be positioned/assembled such that the when the valve 120 is in the closed configuration an entirety of the poppet 130 is positioned within the cartridge internal cavity 166. According to one embodiment, a portion of the poppet 130 may extend beyond the cartridge internal cavity 166 when the valve 120 is in the closed configuration and the valve body 164 may include a passage 310 that allows the valve cartridge 160 to be removed while the poppet 130 is retained within the valve cartridge 160. An illustrated example of the passage 310, in the form of a groove, is shown in FIG. 8.

The method may include removing the valve cartridge 160 from the valve body 164 (e.g., from the hub 228). As shown, removing the valve cartridge 160 may include translating the valve cartridge 160 relative to the valve body 164 (e.g., along the third direction D3). The handle 250 may be attached (if releasably attachable) and manipulated by an operator to facilitate removal of the valve cartridge 160. According to one embodiment, the valve cartridge 160 may be translated through the passage 230 until exiting the valve body 164 via the fourth opening 234. Prior to removing the valve cartridge 160, the method may include removing/disengaging the retention mechanism(s) 252 (if any are included as part of the valve 120).

Removing the valve cartridge 160 from the valve body 164 may include simultaneously removing the poppet 130, the seat 132, and the radial seal 154 from the valve body 164 (e.g., from the hub 228). While removing the valve cartridge 160 from the valve body 164, the pump 124 may remain coupled to the valve body 164 (e.g., via the coupling 128), the pump 142 may remain coupled to the valve body 164 (e.g., via the coupling 146 and the actuator 140), the waterjet cutting head 117 may remain coupled to the valve body 164 (e.g., via the coupling 156), or any combination of the pump 124, the pump 142, and the waterjet cutting head 117 may remain coupled to the valve body 164.

After removal of the valve cartridge 160 from the valve body 164, any or all of the actions described above may be executed in reverse order to insert a replacement valve cartridge 160 within the valve body 164 (e.g., within the hub 228). For example, the replacement valve cartridge 160 may be translated (e.g., along the third direction D3) through the fourth opening 234, into the passage 230, and until arriving within the hub 228. The replacement valve cartridge 160 may be advanced until one or more of the registration features 240 (if present) engage.

Once the replacement valve cartridge 160 is positioned within the hub 228, a portion of the piston 150 may move through the first opening 170 and abut/engage with the poppet 130. Operation of the system 100 may then resume.

Figure 13:
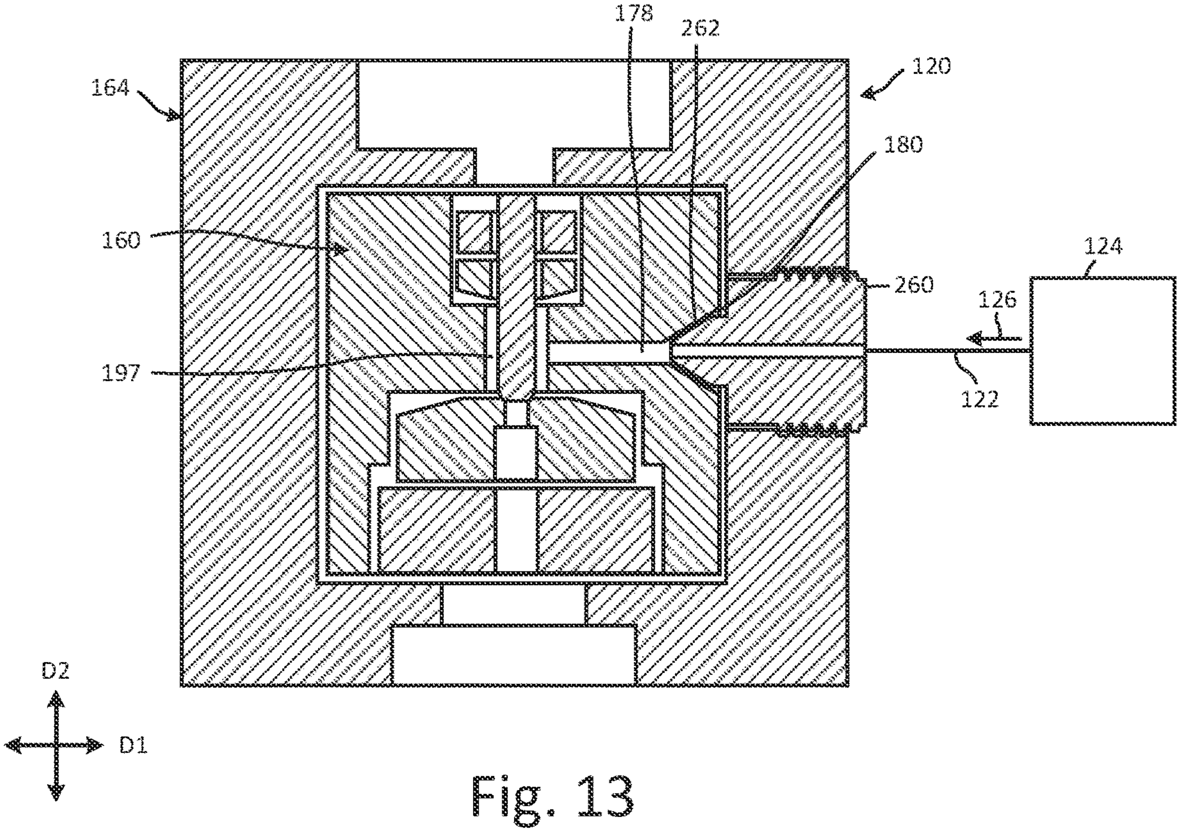
FIG. 13 is a front, cross-section view of the on/off valve illustrated in FIG. 3, according to one embodiment.

Referring to FIG. 13, the valve 120 may be devoid of the face seal 192 (as shown in FIG. 5) that forms part of the path (indicated by arrow 126) for the high-pressure fluid 122 into the cartridge hub 197. As shown, the system 100 may include an autoclave seal 260 that is received by a tapered portion 262 of the non-through hole 178. Removal of the valve cartridge 160 with the tapered portion 262 may include loosening/decoupling of the autoclave seal from the tapered portion 262 (e.g., to remove the autoclave seal 260 from the third opening 180) prior to removal of the valve cartridge 160 from the valve body 164. The autoclave seal 260 may increase the time needed to replace the valve cartridge 160 but may in turn increase the operation lifetime of the valve 120 (e.g., the valve cartridge 160).

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

Many of the methods described herein can be performed with variations. For example, many of the methods may include additional acts, omit some acts, and/or perform acts in a different order than as illustrated or described.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. An on/off valve comprising:

an on/off valve cartridge comprising:

a housing having a first surface, a second surface that faces away from the first surface, and a side surface that extends between the first surface and the second surface;

an internal cavity formed within and enclosed by the housing, the internal cavity including a through hole that extends from a first opening formed in the first surface to a second opening formed in the second surface, the internal cavity further including a non-through hole that extends from a third opening formed in the side surface and intersects the through hole at an intersection;

a seat positioned within the through hole and below the intersection, the seat including a seat body and a seat hole extending through the seat body;

a radial seal positioned within the through hole and above the intersection, the radial seal including a seal body and a seal hole extending through the seal body;

a poppet positioned within the through hole such that a first portion of the poppet contacts the seat and blocks the seat hole, and a second portion of the poppet is positioned within the seal hole of the radial seal, wherein the poppet is movable away from the seat, and an entirety of the poppet is positioned within the through hole between the first surface and the second surface; and a seal positioned within the non-through hole between the third opening and the intersection; and a valve body including:

a body housing having a first body surface, a second body surface that faces away from the first body surface, a side body surface that extends between the first body surface and the second body surface, and a front body surface that extends between the first body surface and the second body surface and that is angularly offset with respect to the side body surface; and a body internal cavity formed within and enclosed by the body housing, the body internal cavity including:

a hub sized to receive the on/off valve cartridge such that the on/off valve cartridge is entirely enclosed within the body housing;

a body through hole that extends from a first body opening formed in the first body surface, through the hub, to a second body opening formed in the second body surface;

a body non-through hole that extends from a third body opening formed in the side body surface, the body non-through hole intersecting and terminating within the hub; and a passage that extends from a fourth body opening formed in the front body surface, the passage intersecting and terminating within the hub, wherein the fourth body opening is sized to permit passage of the on/off valve cartridge into and out of the body internal cavity.

2. The on/off valve of claim 1, further comprising:

an actuator that includes a piston, the piston being translatable towards and away from the seat, the actuator further including an actuator coupling that secures the actuator relative to the valve body, wherein the body through hole includes an upper portion positioned between the first body opening and the hub, and the actuator coupling is secured to the valve body within the upper portion.

3. The on/off valve of claim 1, further comprising:

a tool coupling that secures a tool relative to the valve body, wherein the body through hole includes a lower portion positioned between the hub and the second body opening, and the tool coupling is secured to the valve body within the lower portion.

4. The on/off valve of claim 1, further comprising:

a fluid coupling that fluidly couples a source of high-pressure fluid to the on/off valve, wherein the body non-through hole includes an outer portion positioned between the third body opening and the hub, and the fluid coupling is secured to the valve body within the outer portion.

5. The on/off valve of claim 1, wherein the on/off valve cartridge is positioned within the hub such that the through hole and the body through hole are aligned, and the non-through hole and the body non-through hole are aligned.

6. The on/off valve of claim 1, wherein the body through hole extends along a first body central axis, the body non-through hole extends along a second body central axis, and the passage extends along a third central body axis, the first central body axis is perpendicular to the second central body axis, and the third central body axis is perpendicular to both the first central body axis and the second central body axis.

7. A method of replacing a poppet, a radial seal, and a seat in an on/off valve, the on/off valve including a valve body coupled to a source of pressurized air by a first coupling, and the valve body coupled to a source of high-pressure fluid by a second coupling, the on/off valve including a valve cartridge positioned within an internal cavity of the valve body, the poppet and the seat positioned within an internal cavity of the valve cartridge, the method comprising:

moving the poppet along a first direction into contact with the seat thereby plugging a seat hole of the seat that extends through a seat body of the seat, wherein plugging the seat hole transitions the on/off valve into a closed configuration;

moving the valve cartridge through a passage of the internal cavity of the valve body along a second direction that is perpendicular to the first direction, thereby simultaneously moving both the poppet and the seat relative to the valve body;

moving the valve cartridge through an opening of the valve body, thereby removing the valve cartridge, the poppet, the radial seal, and the seat from the internal cavity of the valve body;

moving a replacement valve cartridge through the opening, thereby entering the internal cavity of the valve body with the replacement valve cartridge, a replacement poppet positioned within an internal cavity of the replacement valve cartridge, and a replacement seat positioned within the internal cavity of the replacement valve cartridge, wherein the first coupling and the second coupling remain coupled to the valve body while moving the poppet along the first direction, moving the valve cartridge through the passage, moving the valve cartridge through the opening, and moving the replacement valve cartridge through the opening.

8. The method of claim 7 wherein the source of pressurized air delivers pressurized air to an actuator thereby moving a piston of the actuator, the method further comprising:

before moving the valve cartridge through the passage, moving the piston away from the poppet until an entirety of the piston is positioned outside the internal cavity of the valve cartridge.

9. The method of claim 8, further comprising:

after moving the replacement valve cartridge through the opening, moving the piston toward the replacement poppet until a portion of the piston is positioned within the internal cavity of the replacement valve cartridge.

10. The method of claim 7 wherein prior to moving the valve cartridge through the passage the valve cartridge includes a face seal positioned within a non-through hole of the internal cavity of the valve cartridge, and the face seal is aligned with the second coupling along a third direction that is perpendicular to both the first direction and the second direction, and wherein moving the valve cartridge through the passage includes moving the face seal out of alignment with the second coupling.

11. The method of claim 7 wherein the second coupling is an autoclave seal, and prior to moving the valve cartridge through the passage a portion of the autoclave seal is positioned within a non-through hole of the internal cavity of the valve cartridge, the method further comprising:

before moving the valve cartridge through the passage, moving the autoclave seal along a third direction, which is perpendicular to both the first direction and the second direction, away from the valve cartridge until an entirety of the autoclave seal is positioned outside the internal cavity of the valve cartridge.

12. The method of claim 7, further comprising:

disengaging one or more retention mechanisms that block at least a portion of the passage between the valve cartridge and the opening of the valve body.

13. The method of claim 7, further comprising:

after moving the replacement valve cartridge through the opening, engaging one or more registration features carried by the replacement valve cartridge, the valve body, or both, thereby aligning the valve cartridge and the valve body.

14. The method of claim 7 wherein the valve body is coupled to a waterjet cutting head by a third coupling, and wherein the third coupling and waterjet cutting head remain coupled to the valve body while: moving the valve cartridge through the passage, moving the valve cartridge through the opening, and moving the replacement valve cartridge through the opening.

15. The method of claim 7, further comprising:

engaging a handle with the valve cartridge, wherein moving the valve cartridge through the passage includes exerting a force on the handle after it is engaged with the valve cartridge.

* * * * *